United States Patent
Huang et al.

(10) Patent No.: US 8,880,863 B2
(45) Date of Patent: Nov. 4, 2014

(54) RESET AND REBOOT CIRCUIT

(75) Inventors: Ching-Ming Huang, Taipei (TW); Hsin Sheng, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 301 days.

(21) Appl. No.: 13/364,376

(22) Filed: Feb. 2, 2012

(65) Prior Publication Data

US 2013/0111200 A1    May 2, 2013

(30) Foreign Application Priority Data

Oct. 28, 2011    (TW) .................................. 100139439

(51) Int. Cl.
| | |
|---|---|
| *G06F 1/24* | (2006.01) |
| *G06F 15/177* | (2006.01) |
| *G06F 9/00* | (2006.01) |
| *B23K 11/24* | (2006.01) |
| *G06F 9/44* | (2006.01) |
| *G06F 1/26* | (2006.01) |

(52) U.S. Cl.
CPC ... *G06F 1/24* (2013.01); *G06F 1/26* (2013.01); *G06F 9/4403* (2013.01)
USPC ..................... 713/2; 713/1; 713/100; 323/318

(58) Field of Classification Search
CPC ............ G06F 1/24; G06F 1/26; G06F 9/4403
USPC .................................. 713/1, 2, 100; 323/318
See application file for complete search history.

(56) References Cited

U.S. PATENT DOCUMENTS

| | | | | |
|---|---|---|---|---|
| 5,576,650 | A | * | 11/1996 | Hirotani et al. ............... 327/142 |
| 5,723,987 | A | | 3/1998 | Ronen |
| 6,097,228 | A | * | 8/2000 | Fujisawa et al. .............. 327/198 |
| 6,876,237 | B2 | * | 4/2005 | Lee et al. ....................... 327/143 |
| 7,840,791 | B2 | * | 11/2010 | Hsieh ............................... 713/1 |

OTHER PUBLICATIONS

Taiwanese Office Action dated on Aug. 15, 2014.

* cited by examiner

*Primary Examiner* — Ji H Bae
(74) *Attorney, Agent, or Firm* — Rabin & Berdo, P.C.

(57) ABSTRACT

A reset and reboot circuit applied in an X86 electronic portable device is provided. The reset and reboot circuit includes: a first level controller; a first switch, turned on in response to a reset/reboot event to enable a control signal; a second level controller, enabling an output signal in response to the enabled control signal; and a logic unit, for disabling a drive signal in response to the enabled output signal. The X86 electronic portable device is driven by the disabled drive signal to reset and reboot, and an embedded controller of the X86 electronic portable device provides an enabled restart signal after it has been reset. The first level controller further disables the output signal in response to the enabled restart signal.

6 Claims, 2 Drawing Sheets

RESET AND REBOOT CIRCUIT

This application claims the benefit of Taiwan application Serial No. 100139439, filed Oct. 28, 2011, the subject matter of which is incorporated herein by reference.

BACKGROUND OF THE INVENTION

1. Field of the Invention

The invention relates in general to a reset and reboot circuit, and more particularly to a reset and reboot circuit applied in an X86 electronic portable device.

2. Description of the Related Art

In a current information world where technologies change at an overwhelmingly fast pace, portable devices, e.g., notebook computers, tablet computers and smart phones, prevail in the daily life as they offer indispensable conveniences. As the public demands higher and higher computation capabilities of electronic portable devices, many conventional electronic devices originally designed for desktop computers are gradually applied in portable devices. For example, among current products, Intel X86 processors that are originally designed for desktop computer applications are now extensively applied in electronic portable devices.

An electronic portable device employing an X86 processor generally lacks a physical switch for system reset and reboot. Thus, there is a need for a reset and reboot mechanism for a portable device that employs an X86 processor.

SUMMARY OF THE INVENTION

The invention is directed to a reset and reboot circuit applied in an X86 electronic portable device having an embedded controller. The reset and reboot circuit of the present invention enables a control signal in response to a reset/reboot event, and provides an enabled output signal in response to the enabled control signal to drive the embedded controller to reset the X86 electronic portable device. After a delayed operating period, the embedded controller further provides an enabled restart signal. The reset and reboot circuit of the present invention further disables the output signal in response to the enabled restart signal. Accordingly, compared to a conventional portable device employing an X86 processor, the reset and reboot circuit of the present invention is advantaged by providing the reset and reboot function for an electronic portable device employing an X86 processor.

According to an aspect of the present invention, a reset and reboot circuit applied in an X86 electronic portable device is provided. The X86 electronic portable device includes an embedded controller. The reset and reboot circuit includes an output node, first and second nodes, first and second level controllers, a switch, and a logic unit. The output node has an output signal. The first node is coupled to the embedded controller, and the second node has a control signal. The first level controller is coupled to the first node and the output node. The switch coupled to the second node is turned on in response to a reset/reboot event to enable the control signal. The second level controller coupled to the second node and the output node is turned on in response to the enabled control signal to enable the output signal. The logic unit disables a drive signal in response to the enabled output signal. The X86 portable device is driven by the disabled drive signal to reset and reboot, and the embedded controller further provides an enabled restart signal to the first node after it has been reset. The first level controller further disables the output signal in response to the enabled restart signal.

The above and other aspects of the invention will become better understood with regard to the following detailed description of the preferred but non-limiting embodiment. The following description is made with reference to the accompanying drawings.

DETAILED DESCRIPTION OF THE INVENTION

Figure 1:
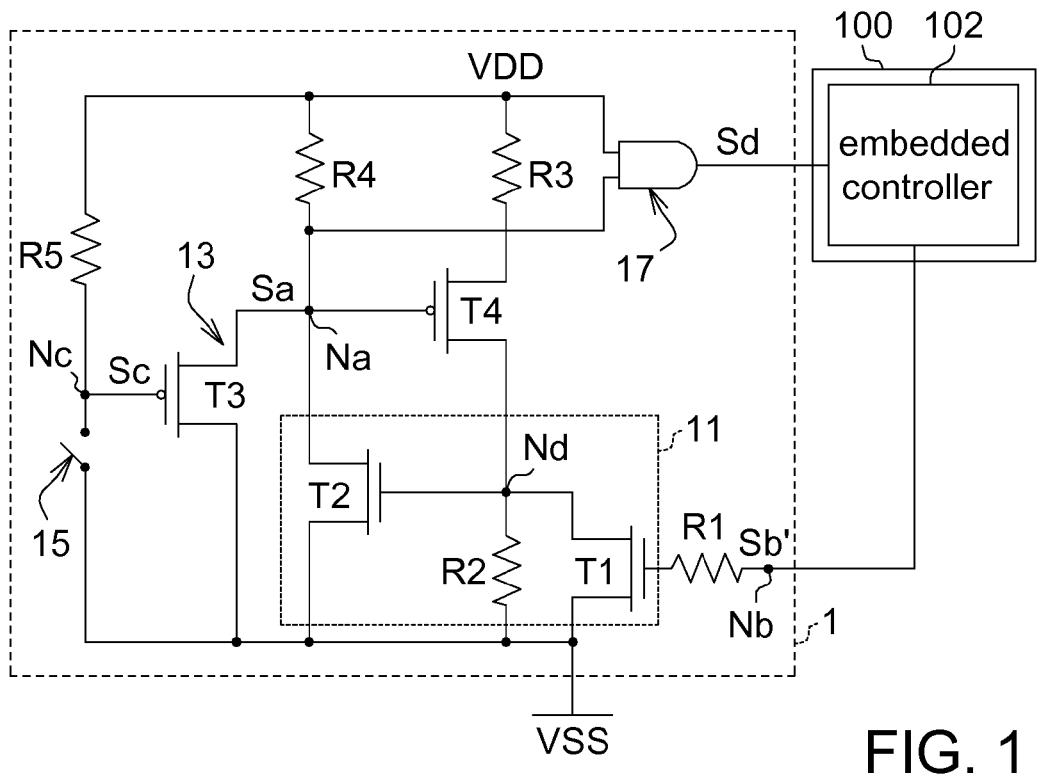
FIG. 1 is a block diagram of a reset and reboot circuit according to an embodiment of the present invention.

FIG. 1 shows a block diagram of a reset and reboot circuit according to an embodiment of the present invention. A reset and reboot circuit 1 is applied in an electronic portable device 100, e.g., a notebook computer, a tablet computer or a smart phone. Further, the electronic portable device 100 employs an Intel X86 processor as its central processor, and further includes an embedded controller 102.

The reset and reboot circuit 1 includes a node Na, nodes Nb and Nc, resistors R1, R3, R4 and R5, level controllers 11 and 13, a switch 15, and a logic unit 17. The output node Na has an output signal Sa, and receives a supply reference voltage VDD via the resistor R4. The node Nb coupled to the embedded controller 102 receives a restart signal Sb provided by the embedded controller 102. The node Nc has a control signal Sc. For example, the restart signal Sb is a signal provided by the embedded controller, e.g., a main on signal.

The level controller 11 is coupled to the node Nb and the output node Na. For example, the level controller 11 includes transistors T1 and T2, a resistor R2, and an intermediate node Nd. The transistors T1 and T2 may be realized by metal oxide semiconductor (MOS) transistors. Further, the transistor T1 has its gate coupled to the node Nb via the resistor R1, its source receiving a ground reference voltage VSS, and its drain coupled to an internal node Nd. The transistor T2 has its gate coupled to the internal node Nd, its source receiving the ground reference voltage VSS, and its drain coupled to the output node Na. The resistor R1 has its one end receiving the ground reference voltage VSS and its other end coupled to the intermediate node Nd.

The switch 15 has its one end coupled to the node Nc, and its other end receiving the ground reference voltage VSS. In response to a reset/reboot event, the switch 15 is turned on to provide the ground reference voltage VSS to the node Nc to enable the control signal Sc. For example, the switch 15 is a user interface physical switch, and the reset/reboot event is an operating event for correspondingly turning on the switch 15 by a user press on the switch 15.

The level controller 13 is coupled to the node Nc and the output node Na. For example, the level controller 13 includes a transistor T3, which is realized by a P-type MOS transistor. Further, the transistor T3 has its gate coupled to the node Nc, its drain receiving the ground reference voltage VSS, and its source coupled to the output node Na.

The logic unit 17 coupled to the output node Na receives the output signal Sa, and accordingly provides a drive signal Sd. For example, the logic unit 17 is realized by an AND gate, which has its first and second input ends respectively receiving the supply reference voltage VDD and the output signal Sa, and its output end for providing the drive signal Sd.

Figure 2:
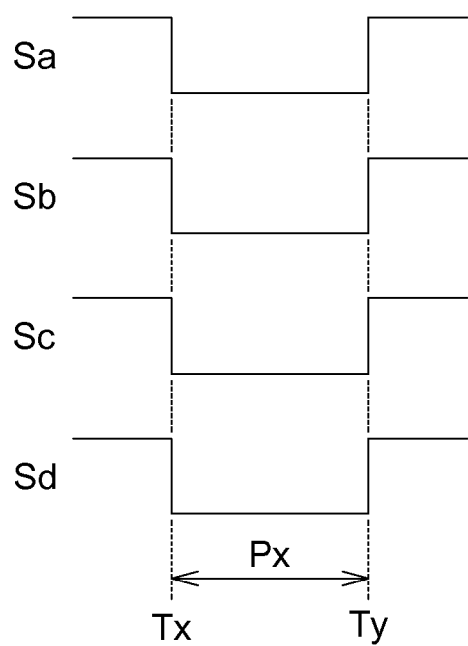
FIG. 2 is a timing diagram of associated signals of the reset and reboot circuit 1 in FIG. 1.

FIG. 2 shows a timing diagram of associated signals of the reset and reboot circuit 1 in FIG. 1. When the reset/reboot event is triggered (e.g., triggered at a time point Tx), the switch 15 is turned on to provide the ground reference voltage VSS to the node Nc, such that a level of the control signal Sc corresponds to the ground reference voltage VSS in an operating period Px.

In response to the control signal Sc corresponding to the ground reference voltage VSS, the level controller 13 is turned on to pull down the output signal Sa at the output node Na to the ground reference voltage VSS in the operating period Px, and thus enables the output signal Sa. In response to the output signal Sa corresponding to the ground reference voltage VSS, the logic unit 17 provides a disabled drive signal Sd (i.e., corresponding to the ground reference voltage VSS) to the embedded controller 102. For example, the drive signal Sd is a power signal of the electronic portable device 100 (including the embedded controller 102). In other words, when the drive signal Sd corresponds to the ground reference voltage VSS, the electronic portable device 100 is correspondingly powered off.

The user trigger reset/reboot event is terminated at a time point Ty after a delayed operating period Px subsequent to the time point Tx. From the time point Ty, the switch 15 is correspondingly opened to stop providing the ground reference voltage VSS to the node Nc, so that the level of the control signal Sc is biased to the supply reference voltage VDD via the resistor R5.

In response to the control signal Sc corresponding to the supply reference voltage VDD, the level controller 13 is turned off to stop pulling down the output signal Sa at the output node Na to the ground reference voltage VSS, so that the level of the output signal Sa is again biased to the supply reference voltage VDD via the resistor R4. In response to the output signal Sa corresponding to the supply reference voltage VDD, the logic unit 17 provides an enabled drive signal Sd (i.e., corresponding to the supply reference voltage VDD) to the embedded controller 102. In response to the drive signal Sd corresponding to the supply reference voltage VDD, the electronic portable device 100 is again powered on to perform a corresponding boot-on procedure. In other words, by halting the power supply in the operating period Px, the electronic portable device 100 is mechanically reset.

In the boot-on procedure, the restart signal Sb (e.g., a main on signal) provided by the embedded controller 102 is correspondingly pulled up from the ground reference voltage VSS to the supply reference voltage VDD. In response to the restart signal Sb corresponding to the supply reference voltage VDD, the transistor T1 in the level controller 11 is turned on to pull down the voltage at the intermediate node Nd back to the ground reference voltage VSS. The transistor T2 is then turned off in response to the ground reference voltage VSS to disconnect the level pull-down path for the node Na.

In an example, the reset/reboot circuit 1 according to the embodiment further includes a transistor T4. With the transistor T2 and the intermediate node Nd, the transistor T4 forms a level maintaining unit, which continuously enables the output signal Sa in response to the enabled output signal Sa (i.e., corresponding to the supply reference voltage VDD). Further, the transistor T4 is a P-type MOS transistor, and has its gate coupled to the output node Na, its drain coupled to the intermediate node Nd and its source receiving the supply reference voltage VDD via the resistor R3.

In response to the output signal Sa corresponding to the ground reference voltage VSS, the transistor T4 is turned on to continuously bias the intermediate node Nd to the high level voltage, so as to turn on the transistor T2 and to continuously bias the output node Na to the ground reference voltage VSS.

Figure 3:
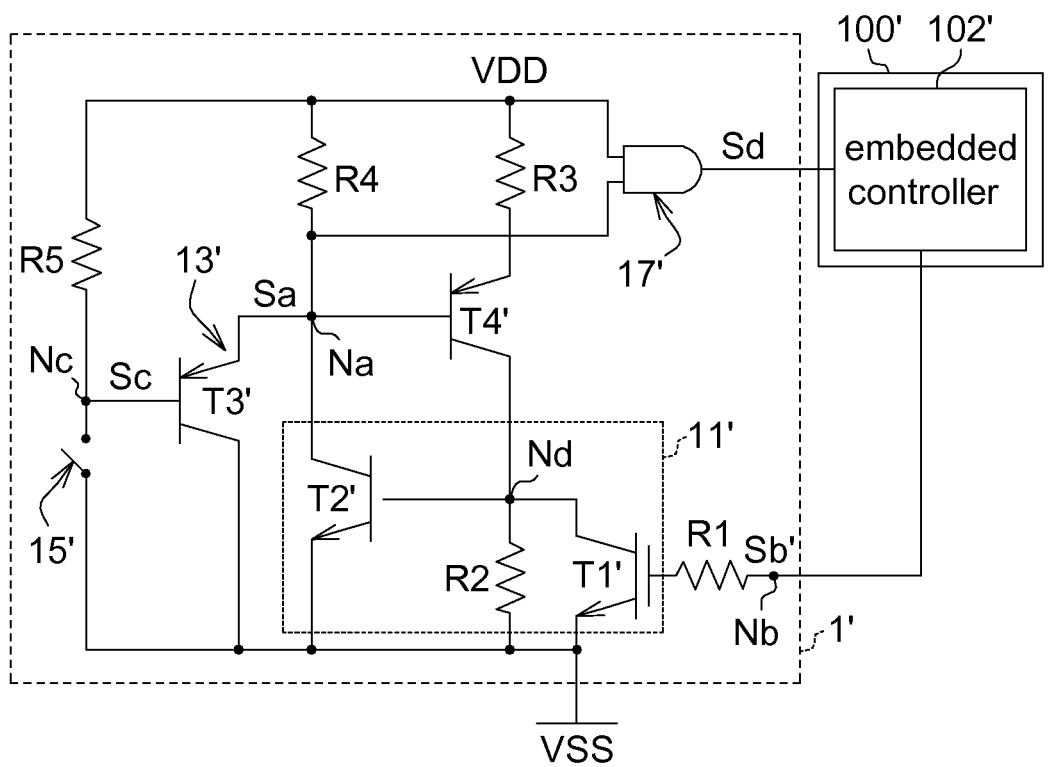
FIG. 3 is another block diagram of a reset and reboot circuit according to an embodiment of the present invention.

It should be noted that the MOS transistors for realizing the transistors T1 to T4 are taken as an illustrative example rather than limiting the present invention thereto. In other examples, transistors T1' and T2' in a reset and reboot circuit 1' may also be realized by NPN bipolar junction transistors (BJT), and transistors T3' and T4' may also be realized by PNP BJT, as shown in FIG. 3

The reset and reboot circuit according to an embodiment of the present invention is applied to an X86 electronic portable device including an embedded controller. The reset and reboot circuit according to an embodiment enables a control signal in response to a reset/reboot event, provides an enabled output signal in response to the enabled control signal to drive the embedded controller to reset the X86 electronic portable device. After a delayed operating period, the embedded controller further provides an enabled restart signal. The reset and reboot circuit of the present invention further disables the output signal in response to the enabled restart signal. Accordingly, compared to a conventional portable device employing an X86 processor, the reset and reboot circuit of the present invention is advantaged by effectively providing the reset and reboot function for an electronic portable device employing an X86 processor.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reset and reboot circuit, applied in an X86 electronic portable device comprising an embedded controller, the reset and reboot circuit comprising:
    an output node, having an output signal;
    a first node, coupled to the embedded controller;
    a first level controller, coupled to the first node and the output node;
    a second node, having a control signal;
    a switch, coupled to the second node, being turned on in response to a reset/reboot event to enable the control signal;
    a second level controller, coupled to the second node and the output node, being turned on in response to the enabled control signal to enable the output signal; and
    a logic unit, disabling a drive signal in response to the enabled output signal;
    wherein, the X86 electronic portable device is driven by the disabled drive signal to reset, the embedded controller provides a restart signal to the first node after having been reset, and the first level controller further disables the output signal in response to the enabled restart signal.

2. The reset and reboot circuit according to claim 1, wherein the first level controller comprises:
    an internal node;
    a resistor, having one end coupled to the internal node and an other end receiving a low level reference voltage;
    a first transistor, having a gate receiving the restart signal, a first input coupled to the internal node, and a second input end receiving the low level reference voltage; and a second transistor, having a gate coupled to the internal node, a first input end coupled to the output node, and a second input end receiving the low level reference voltage.

3. The reset and reboot circuit according to claim 1, wherein the second level controller comprises:
a transistor, having a gate coupled to the second node to receive the control signal, a first input end coupled to the output node, and a second input end receiving a low level reference voltage.

4. The reset and reboot circuit according to claim 1, further comprising:
a level maintaining unit, for continuously enabling the output signal in response to the enabled output signal.

5. The reset and reboot circuit according to claim 4, wherein the level maintaining unit comprises:
an internal node;
a first transistor, having a gate coupled to the output node to receive the output signal, a first end receiving a supply reference voltage, and a second input end coupled to the internal node; and
a second transistor, having a gate coupled to the internal node, a first input end coupled to the output node, and a second input end receiving the low level reference voltage.

6. The reset and reboot circuit according to claim 1, wherein the logic unit comprises:
an AND gate, for providing the drive signal according to the output signal and a high level reference voltage.

* * * * *